C. S. Stearns.

Machine for Splitting & Stripping Leather.

No 3026 Reissued Jul. 7, 1868.

Witnesses:
Frederick Curtis
F. P. Hale Jr.

Inventor:
Caleb S. Stearns
by his attorney
R. H. Eddy

C. S. Stearns.

Machine for Splitting & Stripping Leather.

No 3026 Reissued Jul. 7, 1868.

Witnesses,
Frederick Curtis
H. P. Hale Jr

Inventor:
Caleb S. Stearns
by his attorney
R. H. Eddy

United States Patent Office.

CALEB S. STEARNS AND THOMAS COREY, OF MARLBORO, MASSACHUSETTS, ASSIGNEES OF CALEB S. STEARNS.

*Letters Patent No.* 41,583, *dated February* 9, 1864; *reissue No.* 3,026, *dated July* 7, 1868.

IMPROVED MACHINE FOR SPLITTING AND STRIPPING LEATHER.

The Schedule referred to in these Letters Patent and making part of the same.

TO ALL WHOM IT MAY CONCERN:

Be it known that I, CALEB S. STEARNS, of Marlboro, in the county of Worcester, and State of Massachusetts, have invented an Improved Machine for Splitting and Stripping Leather, of which the following is a full, clear, and exact description, reference being had to the accompanying drawings, making part of this specification, in which—

Figure 3:
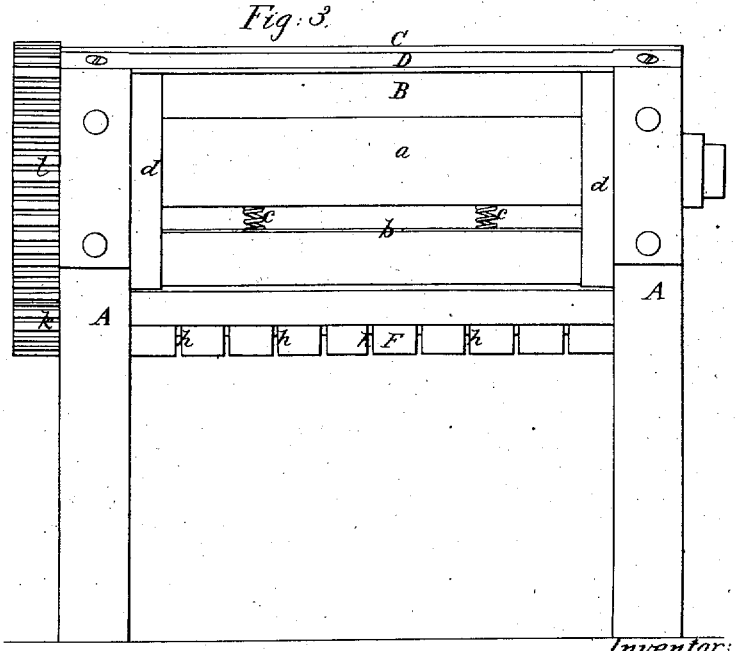

Figure 3 a rear elevation of the same.

Figure 1:
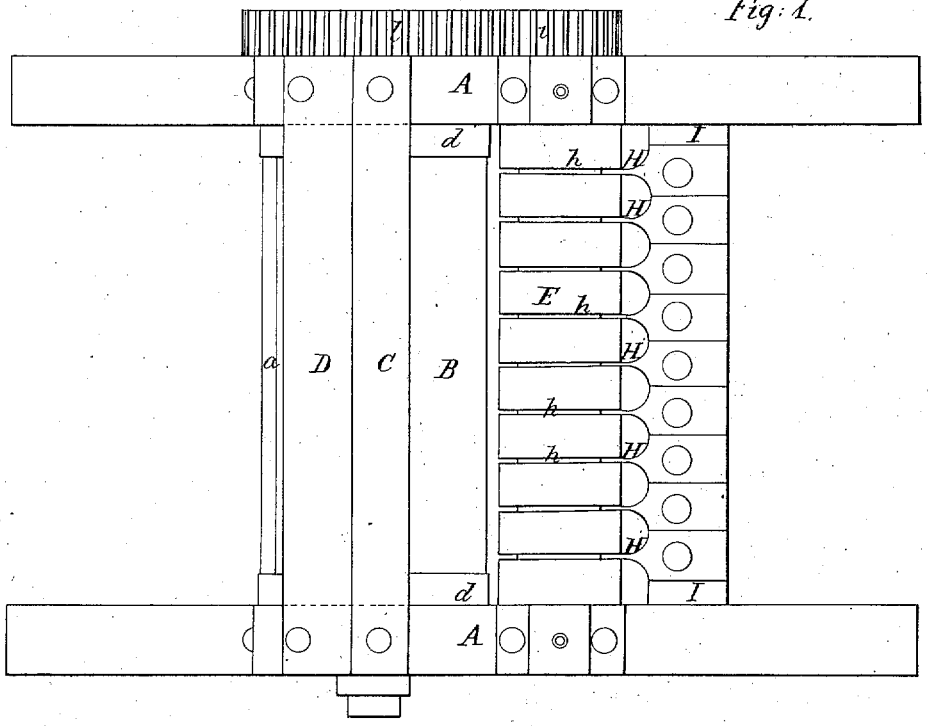
Figure 1 is a plan of my improved machine.
Figure 2:
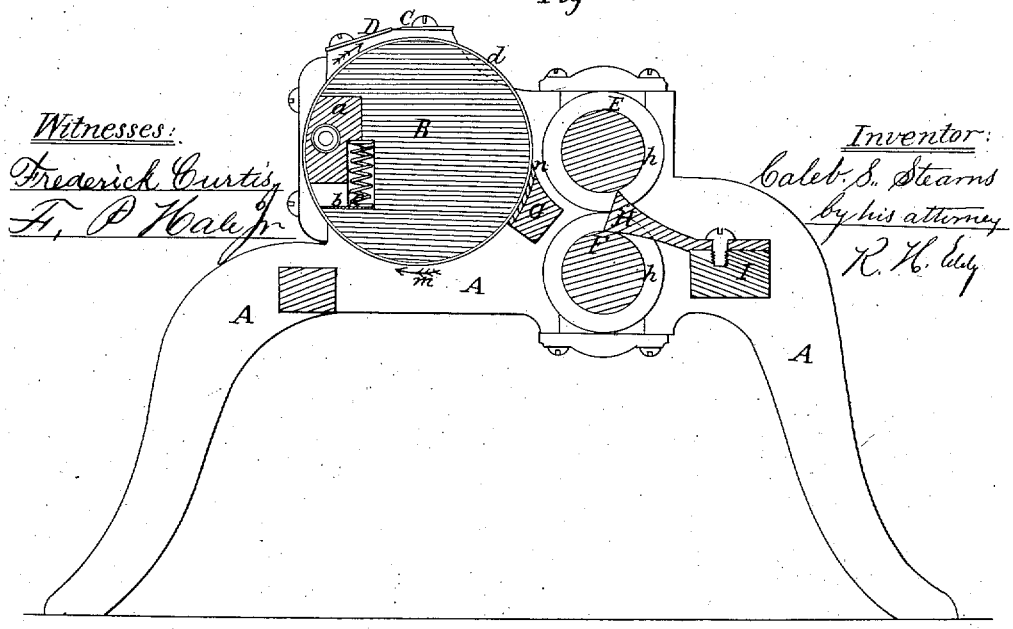
Figure 2 is a transverse section.
Figure 4:
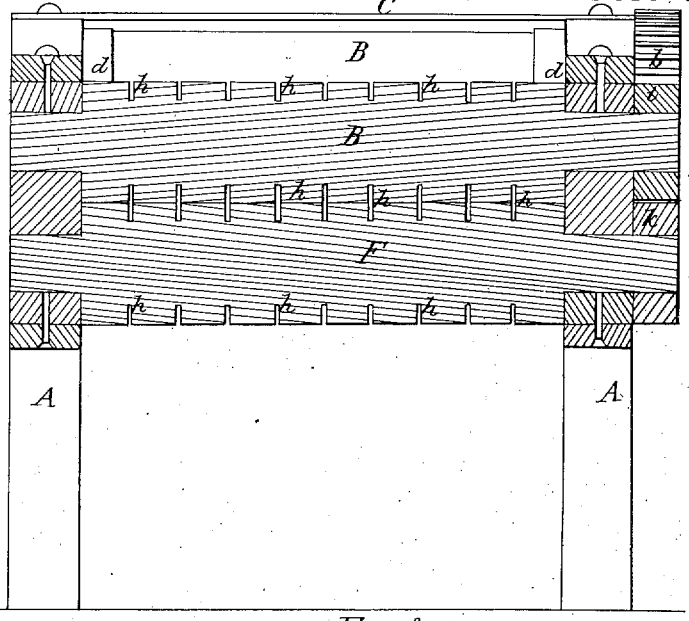

Figure 4 is a longitudinal section through the pair of grooved rollers.

Figure 5:
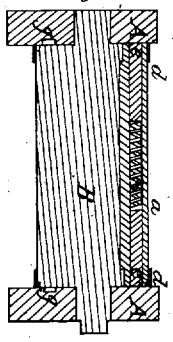

Figure 5 is a longitudinal section of the carrying-drum and its grasping-mechanism, on a reduced scale.

Figure 6:
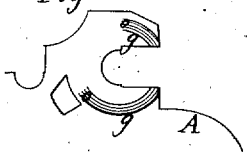

Figure 6 represents one of the cam-grooves for operating the movable jaw of the grasping-mechanism.

Figure 7:
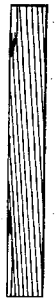

Figure 7 is a section of such groove, developed or extended into a straight line.

My invention consists chiefly in a cylinder provided with a grasping-mechanism for carrying leather or other material around against the knives by which it is split or cut into strips, or in contact with a roller, by which it is compressed and rendered smooth, ready for use, or a grasping-mechanism for holding the material around upon its cylinder, to be acted upon for any other purpose.

My invention also consists in combining in one machine the two operations of splitting and stripping leather, a pair of grooved rollers being used in connection with the carrying-cylinder and its grasping-mechanism.

To enable others skilled in the art to understand and use my invention, I will proceed to describe the manner in which I have carried it out.

In the said drawings, A represents the framework in suitable bearings, in which revolves the shaft of the carrying-drum B, which is recessed out longitudinally, for the reception of the mechanism which grasps the end of the leather or other material to be split, stripped, or rolled.

This grasping-mechanism consists of two jaws, one, *a*, a stationary jaw, forming the edge of the opening in the cylinder into which the end of the material is entered, and the other, *b*, a movable jaw, pivoted at 10 to the ends of the hollow cylinder.

This movable jaw is provided with one or more springs, *c c*, by which it is pressed away from the fixed jaw, and each end of the movable jaw is not only secured to the drum by a hoop, *d*, which passes around it, but is also provided with a journal or stud, *e*, which is pressed by a spring, *f*, out from the jaw *b* into a cam-groove, *g*, formed in the inner surface of the frame, as shown in figs. 6 and 7. A splitting-knife, C, extends longitudinally across the framework directly over and at a short distance from the carrying-cylinder, and is provided with a spring-presser, D, which is placed in its rear, and operates so as to snugly press the material upon the outer surface of the drum at a point close to the knife. Behind the cylinder B are placed a pair of rollers, E F, each of which is provided with a series of grooves, *h h*, extending transversely around it, any two corresponding grooves of the rollers being sufficiently wide to receive and support one of a series of vertical stripping-knives, G G, secured to and projecting down from a cross-bar, H, of the machine. Extending longitudinally between the said rollers and the carrying-cylinder is placed an auxiliary knife or guide-shear, I, which not only separates the uneven or waste piece of the material from the even split piece, but serves to direct the latter into the bite of the rollers against the stripping-knives G G. The two rollers, E F, are provided with gear *i k*, the upper, *i*, of which engages with a gear, *l*, on the shaft of the cylinder B.

*Operation.*

As the cylinder commences to move, the edge of the skin or piece of leather or other material to be split is inserted between the open jaws of the grasping-mechanism, the movable jaw *b* of which soon closes down on the material, and clamps it firmly to the fixed jaw *a*, and holds it while being drawn under the presser and against the splitting-knife and guide-shear I. After the material has been split to an even and uniform thickness, it is carried forward by the drum against the front edge or the guiding-portion, *m*, of the auxiliary knife or guide-shear I, the said portion, *m*, being so curved as to direct the material into the bite of the rollers E F, which seizes and forces it against the series of stripping-knives G G, so as to cause them to reduce it into strips suitable for a variety of purposes. As the end of the piece of material between the jaws is carried against the knife or guide-shear I, it is caused to operate with the fixed jaw *a*, and shears or cuts off the end of the material within the jaws, the even split piece of uniform thickness being drawn away from the cylinder by the rollers E F.

After the jaws of the cylinder B have passed beyond and below the guide-shear I, the movable jaw is caused (through the connections of its stud and spring previously described) to move away from the fixed jaw, so as to allow of the removal therefrom of the end of the material preparatory to inserting another piece therein.

I do not limit myself to the exact construction and manner of operating the grasping-mechanism here shown and described, as it may be varied in many respects, and still answer a good purpose; for instance, the springs *c c* and *f* may be dispensed with, and the movable jaw may be opened and closed by means of its studs working in connection with the grooves. Nor do I limit myself to the use of a grasping-mechanism, the principal features of which consist in a movable and a stationary jaw, as I intend sometimes to use a pair of movable jaws. It is evident that a grasping-mechanism can be applied to the carrying-cylinder of either a machine for splitting, stripping, or rolling leather or other material, or to the carrying-cylinder of any other machine, or a machine which combines two or more of these operations.

Instead of the spring-presser D, a pressure-roller extending longitudinally across the cylinder may be used, if preferred, without departing from the spirit of my invention.

*Claims.*

What I claim as my invention, and desire to secure by Letters Patent, is—

1. A carrying-cylinder, B, provided with an automatic grasping-mechanism, substantially as set forth.

2. I also claim a carrying-cylinder, B, with its grasping-mechanism, in combination with a splitting-knife, C, and spring-presser, D, or equivalent, substantially as and for the purpose described 3. I also claim a carrying-cylinder, B, with its grasping-mechanism, splitting-knife C, and presser D, in combination with a pair of grooved rollers, E F, a series of stripping-knives, G G, and knife or guide-shear I, substantially as and for the purpose set forth.

CALEB S. STEARNS.

Witnesses:
S. J. SHAW,
F. H. SHAW.